United States Patent [19]

Hovis et al.

[11] 4,182,609
[45] Jan. 8, 1980

[54] PROTECTIVE REFRACTORY MEMBER

[75] Inventors: James E. Hovis; Harry P. Finke, both of Pittsburgh; Hans E. Leumann, Washington, all of Pa.

[73] Assignee: Bloom Engineering Company, Inc., Pittsburgh, Pa.

[21] Appl. No.: 887,600

[22] Filed: Mar. 17, 1978

[51] Int. Cl.² ............................................. F27D 1.12
[52] U.S. Cl. .................................................... 432/234
[58] Field of Search ................ 432/233, 234; 138/147, 138/148

[56] References Cited

U.S. PATENT DOCUMENTS

| | | | |
|---|---|---|---|
| 2,693,352 | 11/1954 | Bloom | 432/234 |
| 3,030,250 | 4/1962 | Losse | 138/147 |
| 3,914,100 | 10/1975 | Guskea | 432/233 |

Primary Examiner—John J. Camby
Attorney, Agent, or Firm—Webb, Burden, Robinson & Webb

[57] ABSTRACT

A protective refractory member which protects heat absorptive elements such as pipe in a furnace comprises two parts connected at their respective longitudinal edges to form a peripherally continuous hollow member. Both parts include a reticulated metal structure solidly embedded within a castable refractory matrix. In one of the parts the reticulated metal structure extends outward from each longitudinal edge to form two closed loops. The other part has associated with it a clip connected to the reticulated metal structure. The clip is partially embedded within the part and has hook-like projections, preferably two or more, extending outward from the longitudinal edge which engage the closed loops of the other part to form the hollow protective member. The hook-like connection can also be used to form protective members having discontinuous peripheries.

13 Claims, 9 Drawing Figures

PROTECTIVE REFRACTORY MEMBER

FIELD OF THE INVENTION

This invention relates to furnace insulation systems and, more particularly, to a protective refractory hollow member for protecting heat absorptive elongated elements such as support members and pipe in metallurgical furnaces.

DESCRIPTION OF THE PRIOR ART

A number of different furnace insulation systems are utilized in modern day furnaces to protect the metal structures contained therein, such as skid pipe, crossover pipe, and other support members on pusher furnaces as well as moving and fixed horizontal beams on walking beam furnaces. The pipes are normally hollow and water-cooled thereby making them extremely heat absorptive. The pipes are protected to minimize the heat losses of the furnace. These insulation systems are subjected to high and cylic temperatures, repetitive vibrations, scale buildup, and occasional damaging blows from workpieces or chunks of metal and scale.

Previous insulation systems have been employed which include semicylindrical sections of reinforced refractory insulation joined together and welded to the pipe. One such insulation system is disclosed in U.S. Pat. No. 2,693,352. This system includes refractory sections having interconnected reticulated metal mesh embedded therein. The metal mesh is exposed at the junction of the two sections and is thereafter welded to the pipe. Such a system has been very successful and is advantageous due to the use of a continuous anchorage or reinforced structure concept provided through the use of a continuous interconnected reticulated metal mesh embedded in the refractory adjacent to the water-cooled member. The use of the type of mesh described in this patent provided an adequate anchorage system which was retained in relatively close proximity to the water-cooled member so that it was far less vulnerable to the high temperature than other designs being used at the time. The then conventional design normally was comprised of "Y" or "V" anchors welded to the pipe with such anchors extending to a point relatively close to the hot face of the insulation. Thus, the anchors themselves were subjected to excessive temperature leading to shorter life of the anchorage and subsequently the insulation and substantially more heat flowed through the anchorage system to the water-cooled pipe than in the case of the reticulated mesh covered by U.S. Pat. No. 2,693,352.

An improvement was made in this system by the concept disclosed in U.S. Pat. No. 3,647,194. This improved the attachment means of the reinforced refractory member to the pipe by providing spaced plug-like openings through which the reticulated metal structure is welded to the pipe. However, in each of the above patents, it was necessary to weld the precast member to the pipe and when replacement was required, the old welds at times interfered with the application of new materials. This entailed the necessity of grinding off weld material in preparation for a new application of insulation. Similarly, where spaced "V" or "Y" anchors were welded to the pipe and castable or rammed material formed around such anchors, there was considerable additional loss of heat as the insulation fell off since the area of heat absorption was substantially increased by the area of the anchors. Further, these would burn off and require removal in preparation for new insulation.

The aforementioned necessity of welding precast insulation material to support pipes or alternately welding enormous numbers of anchors to pipes as well as the problems in cleaning off old weld or old anchors in preparation for reinstallation of insulation led to the need for a weldless attachment. Such a system is described in U.S. Pat. No. 3,781,167. That system provides metallic bands which extend around the inner surface of the refractory member which contain metallic members or anchors which can be "V" shaped or "Y" shaped and which extend well out into the refractory. Such a system does eliminate the need for welding the insulating jacket to the pipe; however, the use of anchors spaced apart even though they are welded to straps instead of to the pipe itself, carries the previously stated disadvantages of having the anchors at locations where they are exposed to excessive temperature. The design includes an anchor system which by its nature results in high heat loss since the heat is transferred from the high temperature end of the anchor to the portion welded to the straps, and further, there is a basic disadvantage due to the discontinuity of the anchorage itself as compared to a continuous reticulated metallic mesh. This system also requires work necessary to form the anchorage system involving the welding of anchors to the metallic straps prior to casting or forming the refractory shapes.

SUMMARY OF THE INVENTION

Our refractory member eliminates the need for welding entirely without sacrificing the basic advantages found in the system covered by U.S. Pat. No. 2,693,352. Our design not only protects the mesh against excessive temperature and prolongs its life, but it equally reduces heat loss through the anchorage since it is protected by considerably more refractory than in the case of the "Y" or "V" anchor arrangement. Thus, all of the advantages of the interlocking, continuous reticulated mesh are retained; the mesh is actually used as one element of the attaching mechanism; and the means of attachment covered by our design eliminates all need for welding and the disadvantages related to the welding procedure.

Our invention is an elongated, hollow refractory member for protecting pipe and the like in a furnace. The member is made up of two parts, generally semicylindrical, each part including a reticulated metal structure such as wire mesh solidly embedded therein. In the preferred embodiment, the reticulated metal structure extends out of the opposing longitudinal edges of the one member to form two sets of closed loops. The other part includes a clip adjacent each longitudinal edge secured to the reticulated metal structure and embedded within the refractory matrix. Two hook-like projections extend from the main body of each clip and out from the longitudinal edges so as to be engageable with the closed loops of the other part to form the hollow member.

DESCRIPTION OF THE PREFERRED EMBODIMENTS

The refractory member, generally designated 10, is normally employed in a furnace to protect the metal support structures which may include water-cooled pipes and which are very heat absorptive. A typical example of such a furnace would be a multi-zone reheat furnace for steel slabs prior to hot rolling. The member 10 is normally made of castable refractory components or parts which are joined together to form a hollow member which is installed about the heat absorptive element being protected. Normally a plurality of such members is utilized in end to end relationship to provide a complete insulation system.

Figure 1:
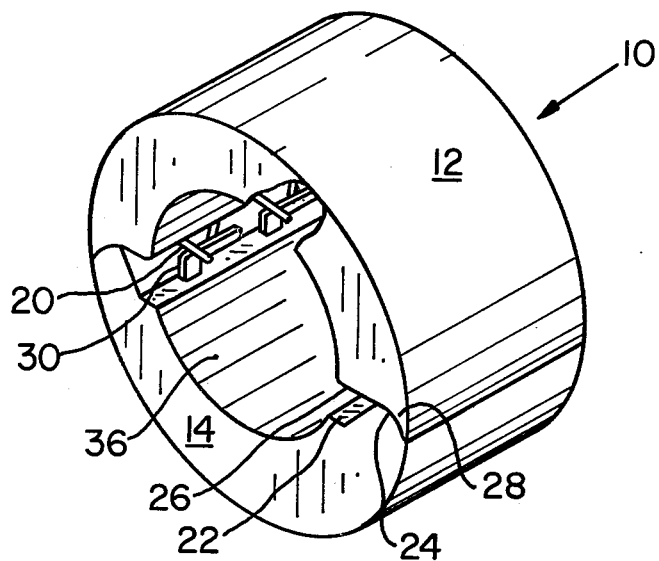
FIG. 1 is a perspective view of the protective refractory elongated hollow member.
Figure 2:
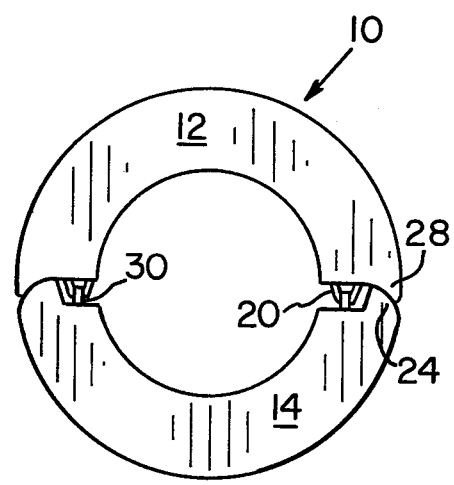
FIG. 2 is an end elevation of the member of FIG. 1.

Specifically, the elongated member 10 is made up of two semicylindrical parts 12 and 14 joined together, FIGS. 1 and 2. Certain applications and some countries outside of the United States utilize rectangular or even triangular configurations, and it will be recognized that the subject invention could be equally embodied in shapes other than semicylindrical. In the preferred embodiment, the member 10 includes a hook or male half 14 and a loop or female half 12.

In order to maximize the strength of the member 10, each part 12 and 14 includes a reticulated wire mesh 16 wholly embedded within the parts 12 and 14 and positioned close to the inner surfaces thereof which will form a hollow area or cylindrical opening 36 to accommodate the absorptive element (not shown) to be protected. The mesh is normally positioned in a suitable mold and the refractory is cast about it.

Part 14, which is semicylindrical, includes two parallel longitudinal edges 21 comprised of an inner longitudinal recessed portion 22 adjacent the hollow area 36 and a built up external longitudinal portion 24 adjacent thereto. Part 14 further includes two clips 18, each of which is connected to the reticulated wire mesh 16 in the area of the longitudinal edges 21 so as to be embedded partially within the part 14.

Figure 3:
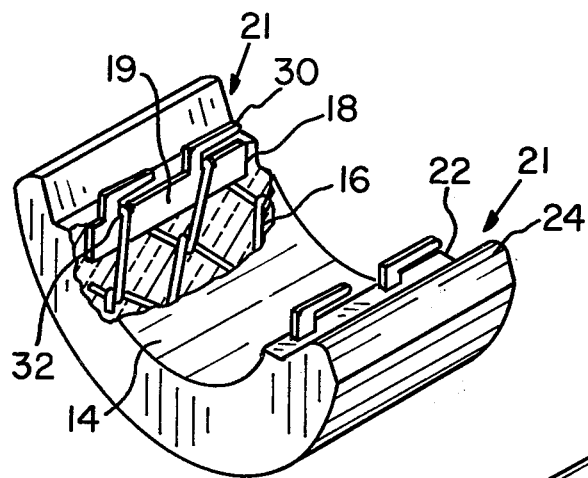
FIG. 3 is a perspective view partly broken away showing the hook half of the member.

Each clip 18 includes two hooks 30 which initially extend outward from the clip body 19 at right angles thereto and then extend parallel to the clip body 19, FIG. 3. Adjacent the base of each hook 30 is a recess 32 which extends into the clip body 19. The recesses 32 accommodate the reticulated wire mesh 16 so as to secure the clips 18 thereto. The clips 18 are embedded within the part 14 so that the only portion which extends outward therefrom are the hooks 30 which are in alignment with one another. These hooks 30 extend out from the part 14 along the recessed inner portion 22 of the longitudinal edges 21.

Several variations in the clips can can be employed. For example, more than two hooks can extend outward from the clip body. Further, rather than recesses, a plurality of holes can extend through the body which would then necessitate weaving the wire mesh through the holes, FIG. 9.

Figure 4:
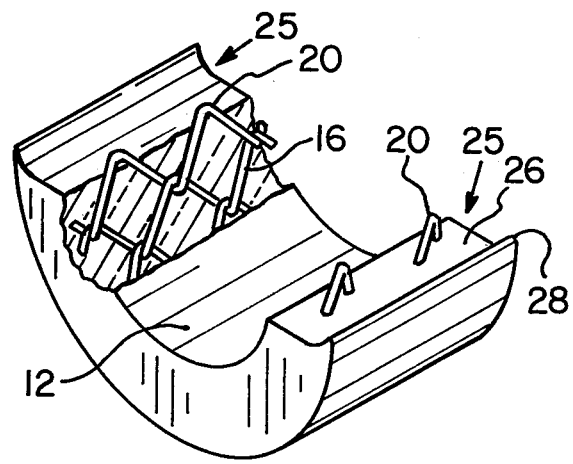
FIG. 4 is a perspective view partly broken away showing the loop half of the member.

The loop half or female part 12 also has two parallel longitudinal edges 25 comprised of a recessed inner portion 26 adjacent the hollow area 36 and an outer built up section 28 adjacent to the recessed portion 26, FIG. 4. The reticulated wire mesh 16 extends out of the respective longitudinal edges 25 in the area of the recessed inner portion 26 to form two closed loops 20 along each edge 25. The loops 20 which are in angular relationship to the longitudinal axis of the loop half form openings which are in alignment with one another.

The male and female parts are joined by merely positioning each about the absorptive element to be protected and inserting the hooks 30 into the loops 20 to form the connection, FIG. 2. Because of the angular relationship of the loops, the openings formed thereby are readily accessible to hooks which generally extend coaxially with the hook half of the refractory member. This connection takes place within the mating recessed portions of the longitudinal edges of the respective parts and the built up outer portion 28 of the female part 12 overlaps the built up outer portion 24 of the male part 14 to insure maximum insulation to the absorptive element being protected.

It is also possible to utilize two semicylindrical sections 14 and connect them together by having the hook-like projections 30 in each section but extending in opposing directions for the two halves. In such an assembly the hooks of one part must be angularly offset from the hooks of the other part so that the hooks properly engage one another.

Figure 9:
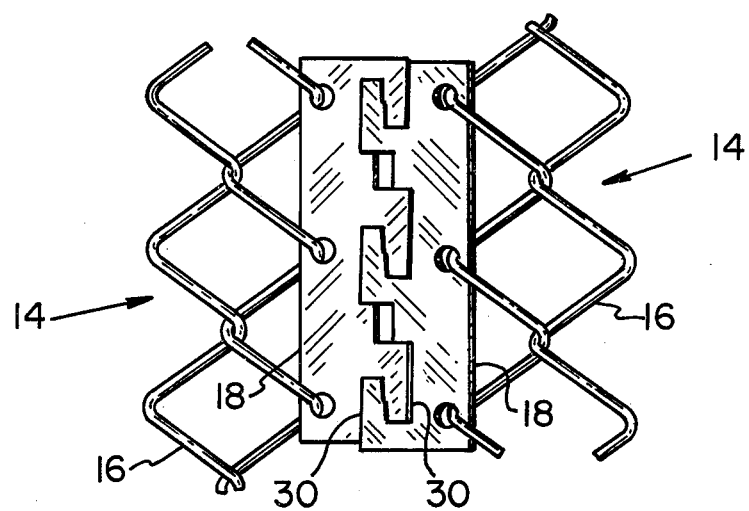

This is shown in FIG. 9 where two components 14 are shown without the refractory so that the connection between the wire mesh 16 and the clip 18 can be seen as well as the interconnection of the respective hooks 30.

It will also be recognized that different forms of connections can be made between the reticulated wire mesh 16 and the clips 18 without departing from the subject invention, although the utilization of the recesses extending into the body portion facilitates assembly of the parts prior to the final manufacture which can include the casting of the refractory about the mesh and clips in a suitable mold.

Figure 5:
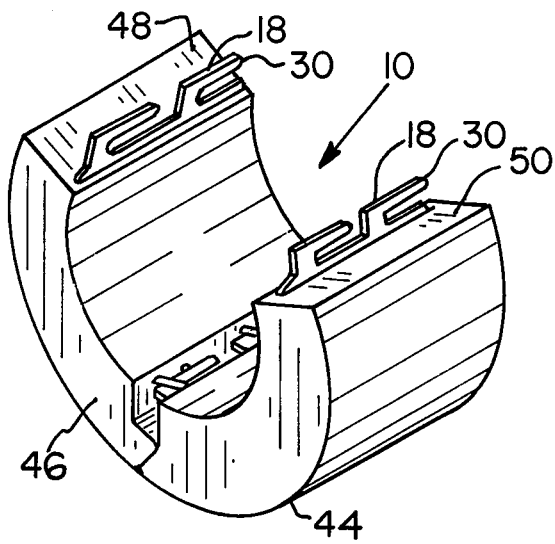
FIG. 5 is a perspective view of a member for use with a pipe having a wear bar.
Figure 6:
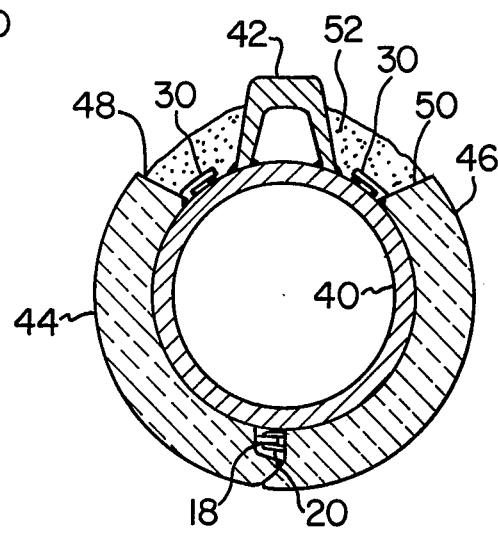
FIG. 6 is a section through such a pipe protected by the member.

The protective member 10 can also be constructed to protect a water-cooled pipe 40 having bar 42 welded thereto such as the type used to accommodate slabs in reheat furnaces, FIGS. 5 and 6.

The member 10 comprises two parts, the male part 44 and the female part 46. Male part 44 includes clip 18 embedded thereinto and female part 46 includes loops 20 as in the early embodiments. However, the parts 44 and 46 are connected to each other along single mating edges positioned at the bottom of pipe 40.

The opposing edges 48 and 50 of parts 44 and 46 respectively, which are not connected to each other, both include clips 18 having hooks 30 extending outward therefrom, FIG. 5. These hooks 30 can then be welded to the pipe 40 adjacent wear bar 42, with the connection between the two parts themselves being a nonwelded hook-loop connection, FIG. 6. Thereafter, the area between the edges 48 and 50 and the wear bar 42 are filled with refractory grout 52.

Figure 7:
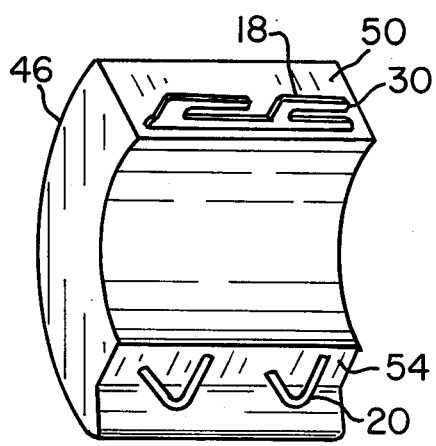
FIG. 7 is a perspective view of one half of the member of FIGS. 5 and 6.

The female part 46 can better be seen in FIG. 7 wherein loops 20 extend out from the recessed longitudinal edge 54 and clips 18 with hooks 30 extend out from edge 50. Loops 20 receive the hooks of the complementary part 46 and the hooks 30 are welded to the pipe 40.

Figure 8:
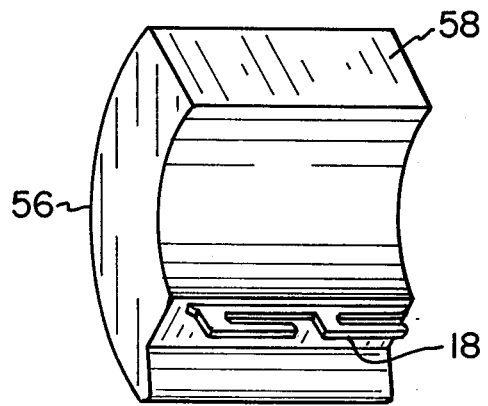
FIG. 8 is a perspective view of another embodiment of a wear bar pipe protective half member and FIG. 9 is an elevation showing the connection of components by hooks.

In still another embodiment for use with a wear bar, no welds are used, FIG. 8. In this embodiment, in which only the male part 56 is illustrated, the unconnected edge 58 is uninterrupted and not secured at all to the pipe to be protected. Only the hook 18 - loop (not shown) connection of the type referred to hereinabove retains two parts together to form the member and retain the member to the pipe. The rigidness of the connection and the close tolerance between the I.D. of the member and the O.D. of the pipe retain the member on the pipe in normal usage.

We claim:

1. In a protective refractory insulation system for protecting heat absorptive elongated elements in a high temperature heat treating furnace and having at least two parts with mating parallel longitudinal edges adapted to be connected to form an elongated member for positioning about said element, each part including an interconnected reticulated metal structure solidly embedded therewithin substantially adjacent an interior surface thereof, the improvement comprising means to connect said parts to each other about said elements, said means being substantially adjacent said interior surface and including hook receptive means associated with the reticulated metal structure and extending out of certain of said mating edges and clip means connected to said reticulated metal structure at other of said mating edges, said clip means being partially embedded in said part and having at least one hook extending outward from said mating edges so as to be attachable to said hook receptive means to interconnect and maintain said parts in assembled relationship.

2. The improvement of claim 1 wherein said hook receptive means includes end portions of said reticulated metal structure extending from said mating edges to form at least one loop to accommodate said at least one hook.

3. The improvement of claim 1 wherein said hook receptive means includes clips connected to said reticulated metal structure, said clips being partially embedded in the part and each having at least one hook extending outward from said certain mating edges and extending in a direction opposite of the hook extending from other of said mating edge wherein said hooks engage each other to interconnect and maintain said parts in assembled relationship.

4. The improvement of claim 2 wherein each of said clip means includes a body portion from which the at least one hook extends and a recess in the body portion adjacent said at least one hook and through which the reticulated metal structure extends.

5. The improvement of claim 1 wherein said mating edges are complementarily recessed along an inner surface in the area adjacent said clip means and said receptive means and said connection means extending out of said recessed areas.

6. The improvement of claim 2 wherein said reticulated metal structure forms two closed loops along each longitudinal edge and said clip has two hooks for attachment to said loops.

7. The improvement of claim 6, said loop being angularly offset from said longitudinal edge to form aligned openings to accommodate said hooks.

8. The improvement of claim 1 wherein each of said parts is semicylindrical.

9. A protective refractory elongated hollow member for protecting pipe and the like in a high temperature heat treating furnace comprising a semicylindrical male part and a semicylindrical female part interconnect at their respective longitudinal edges to form said member, said male member including a reticulated metal structure solidly embedded within the part substantially adjacent an interior surface thereof and having a clip connected at each longitudinal edge, each clip being partially embedded within the part adjacent said interior surface and having recesses engaged by the reticulated metal structure, said clips each having two aligned hook-like projections extending outward from said edge, said female member including a reticulated metal structure solidly embedded within the part substantially adjacent an interior surface thereof and extending outward from each longitudinal edge to form two closed and aligned loops which accommodate the hook-like projections in a connection of the parts to form the member.

10. The member of claim 9, said longitudinal edges being recessed adjacent the pipe and the like to be protected so that a space formed by adjacent recesses of the parts houses the connection.

11. A protective refractory elongated member for protecting pipe having wear bars along a surface thereof in a high temperature heat treating furnace comprising two parts interconnected along a complementary longitudinal edge of each part, one part including a reticulated metal structure solidly embedded therewithin substantially adjacent an interior surface thereof and having a clip adjacent said interior surface engaged by the reticulated metal structure, said clip including hook-like projections extending outward from the longitudinal edge, said other part including a reticulated metal structure solidly embedded within the part substantially adjacent an interior surface thereof and extending outward from the longitudinal edge to form closed and aligned loops which accommodate the hook-like projections in a connection of the parts to form the member, each of said parts terminating at their distal end in a longitudinal edge for positioning adjacent the wear bar.

12. The member of claim 11, including clips secured to the reticulated metal structure and extending out from the distal end longitudinal edges, said clips being weldable to the pipe adjacent the wear bar.

13. The system of claim 1 wherein said clip means includes a body portion having a plurality of holes therethrough, said reticulated metal structure being interwoven through said holes.

* * * * *